Figure 4:
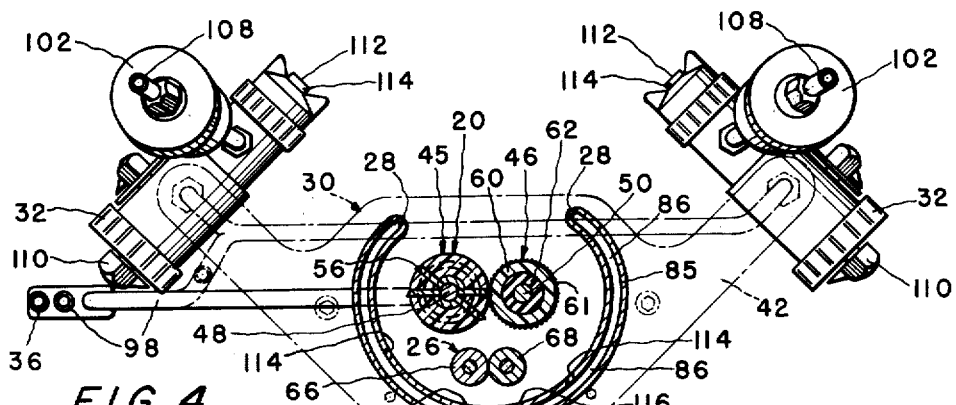

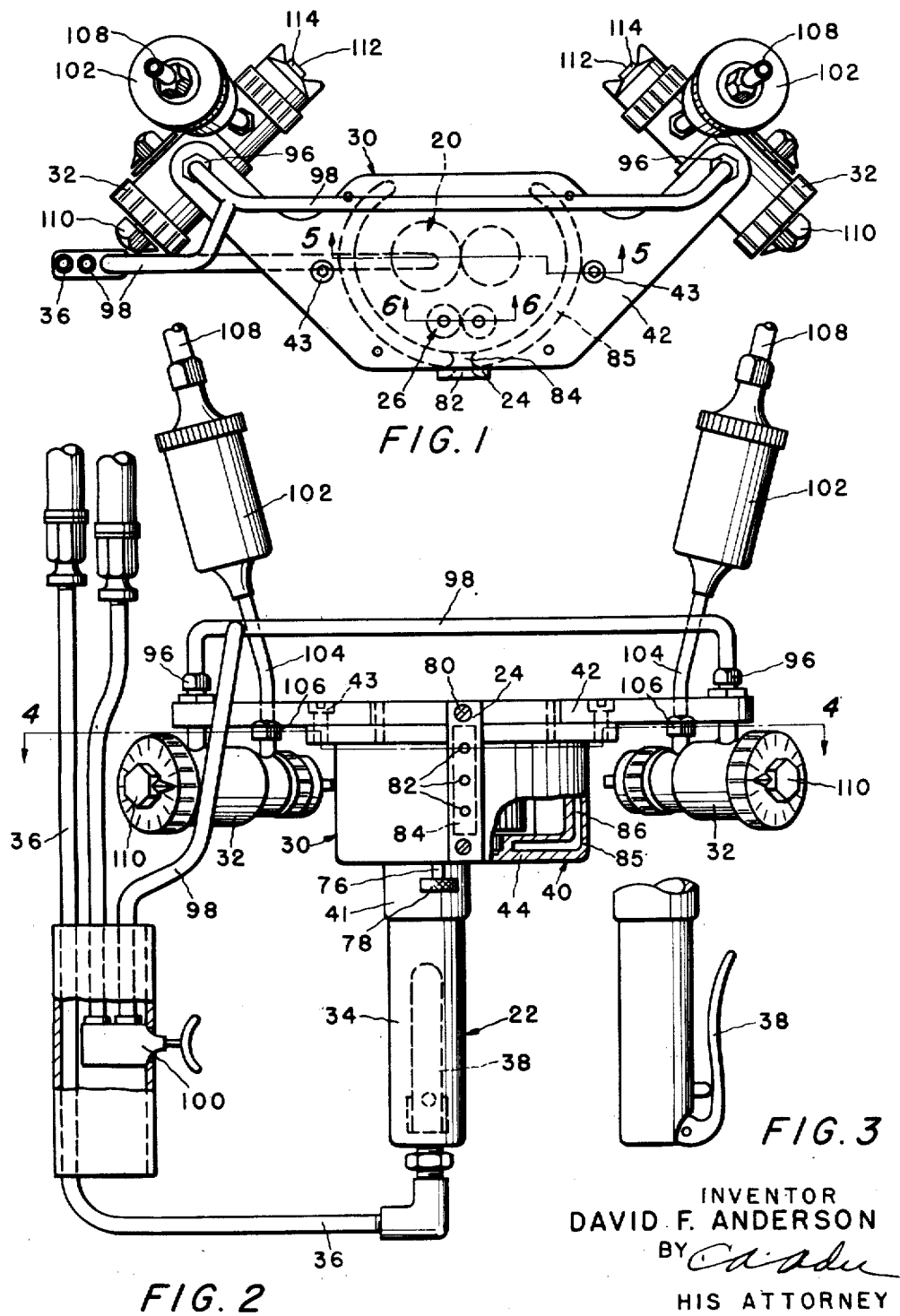

April 2, 1957     D. F. ANDERSON     2,787,314
APPARATUS AND METHOD FOR FORMING A FIBER
REINFORCED PLASTIC ARTICLE
Filed Oct. 13, 1954     2 Sheets-Sheet 2

INVENTOR
DAVID F. ANDERSON
BY
HIS ATTORNEY

United States Patent Office
2,787,314
Patented Apr. 2, 1957

2,787,314
APPARATUS AND METHOD FOR FORMING A FIBER REINFORCED PLASTIC ARTICLE

David F. Anderson, St. Andrews East, Quebec, Canada, assignor to Canadian Ingersoll-Rand Company Limited, Montreal, Quebec, Canada, a corporation of Canada Application October 13, 1954, Serial No. 462,075

13 Claims. (Cl. 154—1)

This invention relates to the method of forming reinforced plastic articles by cutting roving, and particularly glass roving, into selected lengths, separating the ends, or strands, constituting the roving from each other, coating the fibers with an atomized liquid plastic and continuously placing the coated material on a mold to build up the body of a reinforced plastic article; and to an improved machine for carrying out this method, light enough to be hand held and guided when so desired or adaptable to automatic and mechanical operation.

Reinforced plastic articles are usually reinforced with fibers or filaments of glass, impregnated with a bonding agent such as an alkyd polyester type of synthetic resin. In a commonly used form, the fibers are grouped together as roving, a rope like material of 30, 60 or any desired number of strands, or "ends," each end being normally made up of just over 200 continuous glass fibers or filaments. This roving is the raw material from which chopped strand mats, one of the cheapest forms of fibrous glass reinforcement in common use, are made.

There are other types of fibrous glass reinforcement available such as woven fibrous glass cloth and undirectional continuous fiber mats; however one of the cheapest and most commonly used reinforcing materials is the chopped strand mat which has to be cut or tailored to fit a mold against which it is laid and thereafter sprayed or brushed with a bonding resin. Alternatively, equally cheap loose chopped strands may be deposited by hand or be transported in a column of piped moving air to the surface of a mold, to be then impregnated with a bonding resin. In the "compression molding" technique, the glass fibers are preformed to desired shape either by special equipment from loose fibers or by tailoring and fitting together pieces of chopped strand mat.

There are several distinct disadvantages associated with using either the chopped strand mat or the loose chopped fibers. For example, where the chopped strand mat is used, considerable labor is involved in tailoring and fitting the mat to the mold, especially where the form involves compound curvatures. Also, it has been found to be extremely difficult to impregnate the mat with resin without entrapping unwanted air bubbles. Moreover, the chemicals necessary to bond the chopped strands together to form the mats detract from the strength and sometimes from the appearance of the finished product. Also, the process of making the chopped strand mats from the roving increases its cost per pound as a reinforcing material by over 25 percent.

Where loose chopped fibers are used to reinforce the plastic article, it is found that it is difficult to meter out and deposit the fibers uniformly and in the desired quantities on the forms or molds. Also, loose chopped fibers are far more bulky, pound for pound, than is roving. This is a distinct disadvantage when it comes to transporting or storing the fibers.

In as much as once the resin is activated or mixed with all its setting components, it must be used in a relatively short time it is an advantage that with the applicant's invention this mixing of the setting components only takes place at the point of use and in the correct quantities required to bond the amount of reinforcing material being simultaneously deposited on the mold.

By cutting the roving at a known steady rate, separating the constituent "ends," impregnating or coating them with the appropriate quantity of bonding resin, all in one continuous consecutive and simultaneous operation, wastage of raw materials and labor is reduced to a minimum.

Furthermore, the added features included in this improved depositor of cutting the roving into the desired length, and then separating the cut strands, or ends, before they come in contact with the plastic spray, results in a more even distribution of the various length fibers throughout the plastic body thereby increasing the strength of the finished article.

It is to be noted that the cutter of the device may be used independently of the spray guns in instances where it is not desired to coat the cut fibers with a resin upon leaving the cutter. For example, the cutter may be used to advantage to provide cut fibers to mix with resin to form a mixture of fibers and resin for use in transfer or injection molding. The cutter alone can also be used for cutting and depositing fibers to build up a mat or cut fibers for use between retaining sheets such as woven glass cloth or cheese cloth.

It is accordingly one object of this invention to provide a method of, and an improved portable apparatus for cutting glass fiber roving into short lengths, usually between ½ inch and 2 inches, separating the constituent ends from each other, coating the cut fibers with a plastic bonding material and depositing the coated fibers on a mold in a continuous operation.

A further object is to provide such an improved roving cutter with a cutter roller and feed mechanism capable of cutting fiber roving into predetermined lengths and depositing the cut fibers on a surface in desired and even distribution.

Still a further object is to provide such a cutter or depositor with means for separating the cut constituent "ends" of the roving from each other prior to being deposited on a surface, or prior to coating by the plastic spray.

Other objects will become apparent from the following description of the accompanying drawings, which illustrate a preferred embodiment of the invention in which similar numerals refer to similar parts.

Figure 5:
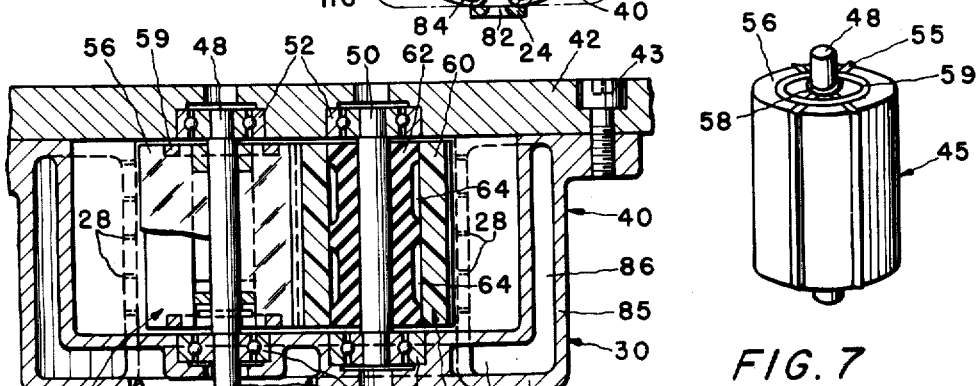
Figure 6:
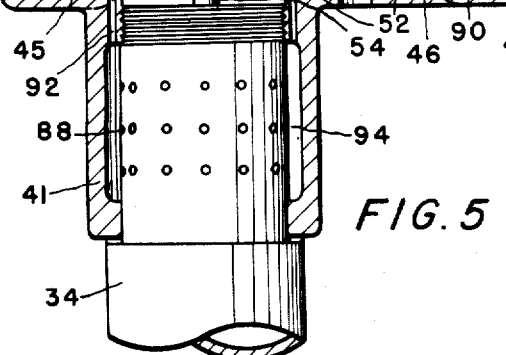
Figure 7:
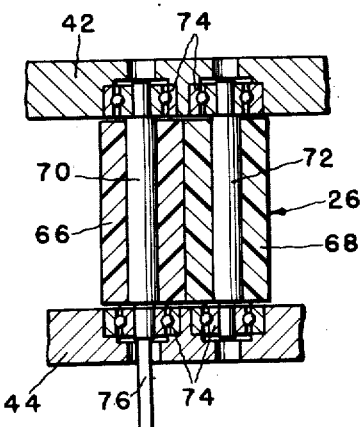
Figure 8:
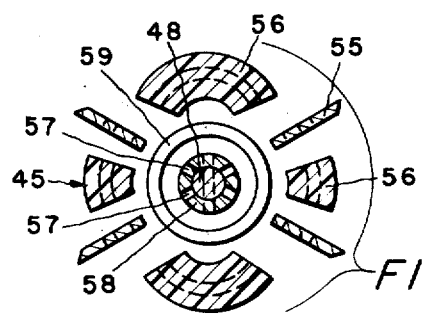

Fig. 1 is a top view of a depositor constructed in accordance with the practice of the invention, Fig. 2 is a back elevation, partly in section, of the depositor, Fig. 3 is a side elevation of the lower end of the depositor, Fig. 4 is a transverse view taken along the line 4—4 of Fig. 2 looking in the direction indicated by the arrows, Fig. 5 is a transverse view taken along the line 5—5 of Fig. 1 looking in the direction indicated by the arrows, Fig. 6 is a transverse view taken along the line 6—6 of Fig. 1 looking in the direction indicated by the arrows, Fig. 7 is a side view of the cutter roller in perspective, and Fig. 8 is an exploded transverse view of the cutter roller.

Referring to the drawings, and more particularly to Fig. 1 and Fig. 2, a preferred form of the depositor is shown as comprising a self-feeding rotary cutter 20 mounted on and driven by a motor 22. Roving is directed through a guide plate 24 and thence between a pair of feed rollers 26 into one side of the cutter 20, whereby the roving is cut into selected short lengths which are ejected from the opposite side of the cutter into an air stream emanating from jets 28 in the body 30 to separate constituent ends from each other. Mounted on the opposite ends of the top plate 42 are spray guns 32 arranged to direct sprays of atomized plastic on the separated "ends" in sufficient quantity to coat the same. Setting agents are contained in the sprays in such combination that when the sprays from the guns intermix the mixture will solidify.

The size and weight of the complete unit shown in Figure 2 are such that the depositor may be conveniently hand-held and readily manipulated to direct a continuous stream of plastic coated fibers onto a form or mold to build up the body of the reinforced plastic article being manufactured.

Referring in greater detail to the construction of the depositor, the motor 22 may be either an air-operated or an electric motor. For the purpose of illustration, the motor 22 shown is of the air-operated type having a casing 34 or relatively small diameter which may serve as a handle for the depositor. Connected to the lower end of the casing 34 is the air intake line 36 for the motor as is also its speed control lever 38. Mounted on the upper end of the casing 34 is the cutter frame 30, which comprises a lower body 40 having a cylindrical extension 41 threadedly connected to the casing 34 and a top plate or cover 42 bolted by means of screws 43 to the upper surface of the body 40 in spaced parallelism with a lower transverse portion 44 of the body.

The cutting components of the cutter 20, more clearly shown in Figs. 4, 5, 7 and 8, are in the form of a pair of cylindrical rollers 45 and 46 positioned in spaced parallelism between the body 40 and the plate 42 and have their respective shafts 48 and 50 supported by anti-friction bearings 52 mounted in the body and the plate 42. The shaft 48 of the driving roller 45 is driven directly by the drive shaft 54 of the motor 22 and the driven roller 46 is driven by rolling frictional contact with the driving roller 45.

In the form of the invention shown, the driving roller 45 serves as the cutting cylinder and is accordingly provided with cutting elements or blades 55 arranged to contact the driven roller for cutting the roving into the selected short lengths, normally between one half inch to two inches. The blades 55 are mounted between segments 56 and in accommodating slots 57 in a sleeve 58 fixedly mounted on the shaft 48 and secured therein by rings 59 embedded in the opposite ends of the segments 56. For the purpose of illustration, four blades are shown and the segments 56 are formed of plastic, but it is understood that the segments may be made of any suitable material and that the number and angular spacing of the blades 55 is determined by the desired length and variety of lengths into which the roving is to be cut, as well as the diameter of the roller 45. That is to say, the length of the cut roving sections is determined by the peripheral distance between succeeding blades.

The roller 46 should present a surface hard enough to enable the cutter blades 55 effectively to cut the roving and yet the driven roller as a unit must be sufficiently elastic or resilient to minimize cutting of the roller itself and to permit knots or tangles of rovings to pass between the rollers. For example, if the cutter blades extend twenty thousandths of an inch from the peripheral surface of the driving roller 45, then the driven roller must be capable of transversely deflecting substantially the same distance away from the driving roller to avoid cutting of the roller 46. Likewise, the peripheral surface of the driven roller 46 should cooperate with the cutter blades to create the most effective cutting action possible and at the same time provide sufficient gripping qualities to advance the roving to the successive cutter blades, thereby making the cutter 20 self-feeding.

For the foregoing purpose, the driven roller 46 comprises a relatively hard outer sleeve 60, for example, of nylon, mounted on a relatively flexible inner core 62. The core is sufficiently elastic to permit the outer sleeve 60 to deflect transversely to prevent damage to the sleeve and to permit the passage of tangled roving. It must however present sufficient resistance to such deflection to enable the cutter blades to sever the roving.

Consistent with these requirements, the core 62 can be made of a compressible material such as sponge rubber. If solid rubber is used the core must be shaped so as to provide space for the movement of the rubber under deflection loads. For example, a solid rubber core 62 is shown mounted centrally on shaft 50 and positioned by lips at either end of the shaft. The sleeve 60 is press fitted to the core 62, but is supported at its end and central peripheral portions, only so that annular spaces 64 are formed therebetween. Thus, when the sleeve 60 is deflected by the forces caused during normal cutting operation or by tangled roving entering the cutter, the end and central portions of the core are forced into the spaces 64, thereby permitting sufficient deflection of the sleeve to preclude damage to the sleeve or interruption of cutter operation.

The path of the roving entering the cutter is via the guide holes 82 whence it passes between the feed rollers 66 and 68, which rollers are positioned between the lower body portion 44 and the plate 42 in parallel relation to each other and to the cutter rollers 45 and 46, and have their respective shafts 70 and 72 supported by anti-friction bearings 74 mounted in the body and the plate with sufficient space between the rollers 66 and 68 to provide a rolling friction drive when the roving is introduced therebetween.

The peripheral surfaces of the feed rollers 66 and 68 must be elastic enough to avoid putting excessive side loads on the bearings when tangled roving passes between them. These rollers must also be heavy enough so that when rotated at high speed by the frictional pull of the roving passing between them, they will provide the rotative inertia to feed a small length of roving towards the cutter rollers 45 and 46 after the cutter rollers have ceased to rotate. To this end the feed rollers 66 and 68 have comparatively heavy steel shafts on which are mounted rubber sleeves. The effect of the rotative inertia of the feed rollers is to ensure that the cutting rollers re-engage the roving after a stop, without need for the manual rotation of roller 66 as described in the following paragraph.

Roller 66 is provided with an extension 76 of the shaft 70 passing through the lower portion of the body 44 and on the lower end of which is fixedly mounted a knurled wheel 78 for the purpose of manually rotating the roller to feed the roving into position for engagement between the cutter roller 45 and the driven roller 46.

In order to permit relatively free movement of the depositor without danger of binding the roving passing between the feed rollers, the guide plate 24 is secured by screws 80 to the outside of the body 30 in parallel spaced relation to the contact line between the feed rollers 66 and 68. For this purpose the plate 24 contains three funnel-shaped holes 82 perpendicularly disposed thereto and registering with a clearance passage 84 in the body 40. Thus up to three strands of roving may be directed through the holes and between the feed rollers to the line of contact of the cutting rollers 45 and 46 at one or all of three points simultaneously, depending on the quantity of cut fibers desired. This would be determined by the size of the plastic article being manufactured or the speed of production required.

The middle portion 85 of the body 40 between the transverse portion 44 and the cap plate 42 is parallel to the cutter rollers 45 and 46 and is arcuate shaped. It has an internal chamber 86 communicating with the motor exhaust ports 88 in the upper part of the casing 34 through a passage 90 in the lower transverse body portion 44, and a plurality of interconnecting longitudinally disposed holes 92 in the extension 41 between the passage 90 and an annular chamber 94 surrounding the ports 88. To prevent air leakage from the chamber 94 to the atmosphere, the upper portion of the casing 34 is machined to a tight sliding fit in the body extension 41 to provide a seal therebetween.

Spaced at regular intervals along the edges of the arcuate shaped body portion 85 is a plurality of holes forming the jets 28 venting the chamber 86 to the atmosphere, and arranged such that a series of converging jets or air streams are directed at the short lengths of roving ejected by the cutter 20 for the purpose of separating the constituent "ends," or strands, from each other but without separating the ends down to individual filaments.

In order ot prevent the possibility of an accumulation fiber fuzz on the cutter rollers 45 and 46 and the feed rollers 66 and 68, this being a condition which may arise due to a static electrical effect and at times impairs the operational efficiency of the depositor, a plurality of holes are arranged in four lines in the inside wall of the arcuate shaped body portion 85 to form jets; one set of jets, designated 114, directs streams of exhaust air from the chamber 86 against the cutter rollers, the other set of jets 116 similarly directs air streams against the feed rollers.

The spry guns 32 are mounted at opposite ends of the top plate 42 and are arranged to direct converging plastic sprays which intersect at a suitable distance from and in front of the cutter 20, and impregnate or coat the roving, after being subjected to the separating action of the air jets, with activated resin. The guns 32 may be of any type adapted to receive liquid plastic and air and emit it in the form of an atomized spray in the manner of the gun disclosed in the United States Patent No. 2,059,706. The guns shown herein, by way of illustration, are provided with an air connection 96 for connection with an air line 98 leading to a source of compressed air (not shown) through a control valve 100.

Liquid plastic from containers (not shown) is supplied to the guns 32 by air pressure through filters 102 and pipe lines 104. Preferably one of the guns 32 is supplied through the line 104 with a mixture of a resin and a catalyst, and the other gun is supplied with a mixture of a resin and an accelerator. These two mixtures kept apart from each other resist setting and remain usuable for several days. However, when the two mixtures are mixed together, as happens when the two sprays converge, they will set in a matter of minutes.

The rate of discharge of plastic from the guns 32 may be varied by rotation of a control valve 110 on the rear end of the guns, or by changing the pressure on the resin in the containers (not shown) or by changing the nozzle aperture area of the discharge 112 of guns 32. Both guns are controlled simultaneously by opening or closing valve 100.

To prepare the simultaneous depositor for operation, the ends of roving of glass fibers are manually introduced through the holes 82 in the guide plate 24 and advanced to the feed rollers 66 and 68. The roving is then drawn between said rollers by manually rotating roller 66 until the roving reaches the line of contact of the cutter rollers 45 and 46.

After the cutter 20 has been started by depressing lever 38, the roving is automatically and continuously pulled into the machine by the rotation of the cutter rollers and is cut into lengths corresponding to the distances between adjacent blades on cutter roller 45. The roving in being drawn through the feed rollers imparts high rotational speed to the feed rollers.

The chopped strands of roving are ejected through the jets of air issuing from holes 28, whereby the constituent ends of the chopped strands are separated from each other. They then pass into the converging sprays of resin emerging from nozzles 112 whereby they are coated or impregnated with the now fully activated resin, prior to being deposited on the surface of a form or other surface. Experiments have shown that if the cutter is operated at a speed which will eject the cut roving at a velocity sufficient to carry the roving a horizontal distance of about eighteen inches, this is satisfactory under most operating circumstances.

When the operator releases lever 38, the cutting rollers cease to rotate almost immediately. The feed rollers, on the other hand, because of their higher rotational speed and lower frictional resistance to rotation, continue to rotate through a few more degrees after the cutting rollers are stationary so as to push the roving against the cutting rollers, thereby ensuring that the roving will be engaged by the cutting rollers when the machine is restarted.

I claim:

1. A reinforced plastic depositor comprising, in combination, a frame, a motor connected to the frame, a cutter on the frame driven by the motor and adapted to cut roving into predetermined lengths and eject the cut roving clear of the depositor, jet means arranged to direct an air stream on the cut roving for separating the strands thereof from each other, an air operated spray gun on the frame arranged to spray liquid plastic on said strands of fibers and project the resulting plastic coated fibers in an organized stream, and liquid plastic supply means for said gun.

2. A reinforced plastic depositor comprising, in combination, a frame, a motor connected to the frame, a cutter on the frame driven by the motor and adapted to cut roving into predetermined lengths and eject the cut roving clear of the depositor, jet means arranged to direct an air stream on the cut roving for separating the strands thereof from each other, a spray gun on the frame arranged to spray liquid plastic on said strands of fibers and project the resulting plastic coated fibers in an organized stream, guide means on the frame to position the roving for engagement by the cutter, guide means on the frame for directing the roving to the support means, jet means mounted on the frame to direct an air stream on the cutter to blow fiber fuzz therefrom, and liquid plastic supply means for said gun.

3. The combination with a reinforced plastic depositor having a frame, a cutter on the frame adapted to cut roving into predetermined shorter lengths, of jet means including a portion of the frame having an opening arranged to direct an air stream on the cutter for blowing fiber fuzz therefrom.

4. The combination with a reinforced plastic depositor having a frame, a cutter on the frame adapted to cut roving into shorter lengths, and support means to guide the roving to the cutter, of means on the frame having an opening arranged to direct an air stream on the support means for blowing fiber fuzz therefrom.

5. The combination with a reinforced plastic depositor having a frame, a cutter on the frame adapted to cut roving into predetermined shorter lengths and eject said shorter lengths therefrom, and support means to guide the roving to the cutter, of jet means including one portion of the frame having an opening arranged to direct an air stream on the cut lengths of roving for separating the strands thereof from each other, another portion of the frame having an opening arranged to direct an air stream at the feed means for preventing an accumulation of fiber fuzz thereon, and a third portion of the frame having an opening arranged to direct a stream at the support means for preventing an accumulation of fiber fuzz thereon.

6. A reinforced plastic depositor comprising, in combination, a frame, a motor on the frame, a cutter on the frame driven by the motor to cut roving into shorter lengths and to eject said shorter lengths of roving therefrom, jet means mounted on the frame to direct air streams at the shorter lengths for separating the constituent fibers thereof from each other, a pair of spray guns on the frame arranged to emit converging sprays of liquid plastic onto said fibers and to project the resulting plastic coated fibers in an organized stream, support means on the frame for the roving including a pair of parallel disposed rollers to engage the roving therebetween and to position said roving for engagement by the cutter, jet means mounted on the frame to direct air streams at the cutter rollers and the support rollers to blow fiber fuzz therefrom, and liquid plastic supply means for said guns.

7. A portable reinforced plastic depositor comprising, in combination, a frame, a motor on the frame, a cutter on the frame driven by the motor to cut roving into shorter lengths, jet means mounted on the frame to direct air streams at the ejected shorter lengths for separating the constituent fibers thereof from each other, spray guns on the frame arranged to emit converging sprays of liquid plastic onto said fibers and to project the fibers in an organized stream, support means on the frame for the roving, said support means including a pair of parallel disposed rollers to engage the roving therebetween to position said roving for engagement by the cutter, manually operable means on one of the support rollers to rotate said support rollers for feeding the roving to the cutter, guide means comprising a detachably mounted plate having a plurality of funnel shaped openings to direct the roving between the support rollers to the cutter at various points along the length of the said rollers, jet means mounted on the frame to direct air streams at said cutter and at the support rollers to prevent the accumulation of fiber fuzz thereon, and means for supplying liquid plastic to the guns.

8. The method of forming a fiber reinforced plastic article in a single operation, comprising the steps of first cutting roving into shorter lengths, then separating the constituent shorter length fibers from each other, next blending a mixture of plastic resin and a catalyst with a mixture of plastic resin and an accelerator by projecting a spray of one said mixture at a spray of the other mixture, then combining the resulting unset resin mixture with the individual fibers, and finally continuously projecting the combined resin and the entrained fiber mixture in an organized directable stream.

9. In a rotary cutter for a reinforced plastic depositor having a motor, the combination of a pair of rollers in parallel spaced relation to each other, a plurality of angularly spaced cutting elements on the periphery of one of the rollers to contact the other of said rollers to cut roving therebetween into shorter lengths, said one roller being driven directly by the motor and said other roller being driven through frictional contact with the said one roller, said other roller comprising a relatively hard outer sleeve having a corrugated peripheral surface including a plurality of longitudinally extending grooves for interlocking engagement with said cutting elements to effectively cut the roving therebetween and for engagement with the roving to advance the roving to the cutting elements, and a resilient core mounted within the outer sleeve and having supporting contact therewith only at points spaced along the length of the sleeve.

10. A roller for a rotary cutter in a reinforced plastic depositor comprising, an outer sleeve composed of a relatively hard wear-resisting material and having a corrugated peripheral surface consisting of a plurality of grooves extending longitudinally thereof, and an elastic core supporting the outer sleeve at relatively spaced areas along the length of the sleeve and composed of a relatively softer material than the sleeve.

11. The combination with a reinforced plastic depositor having a frame and a cutter on the frame, of support means including a pair of rollers in parallel spaced relation to each other for engaging roving therebetween to position said roving for engagement by the cutter, and guide means on the frame to direct the roving between the support rollers to various points along the length of the cutter.

12. The combination with a reinforced plastic depositor having a frame and a cutter on the frame, of support means including a pair of parallelly disposed rollers in frictional engagement with each other to transmit movement from one roller to the other, manually operable means on one of the rollers to rotate said rollers for feeding roving to the cutter, and guide means on the frame comprising a detachably mounted plate having a plurality of funnel shaped openings to direct the roving between the support rollers to various points along the length of the cutter.

13. The combination with a reinforced plastic depositor having a frame, a cutter on the frame adapted to cut roving into shorter lengths and eject said shorter lengths herefrom, of jet means on the frame having an opening arranged to direct an air stream on the ejected shorter lengths of roving for separating the constituent fibers thereof from each other.

References Cited in the file of this patent

UNITED STATES PATENTS

| | | |
|---|---|---|
| 2,571,334 | Browne | Oct. 16, 1951 |
| 2,702,261 | Bacon et al. | Feb. 15, 1955 |

UNITED STATES PATENT OFFICE

CERTIFICATE OF CORRECTION

Patent No. 2,787,314                                                   April 2, 1957

David F. Anderson

It is hereby certified that error appears in the printed specification of the above numbered patent requiring correction and that the said Letters Patent should read as corrected below.

Column 6, line 28, for "guide" read --support--; line 55, for "feed means" read --cutter--; line 73, strike out "rollers".

Signed and sealed this 3rd day of December 1957.

(SEAL)
Attest:
KARL H. AXLINE
Attesting Officer

ROBERT C. WATSON
Commissioner of Patents